United States Patent [19]
Chung

[11] Patent Number: 6,000,760
[45] Date of Patent: Dec. 14, 1999

[54] DEVICE FOR TILTING HEADREST FOR AUTOMOBILE AND DEVICE FOR MOVING HEADREST FORWARD AND BACKWARD IN WHICH THE TILTING DEVICE IS USED

[76] Inventor: Hae Il Chung, 1-101 Taeyoung Apatment, 2Lot 9Block Yeounhee 2giku, Seo-gu, Inchon 404-180, Rep. of Korea

[21] Appl. No.: 09/091,938
[22] PCT Filed: Oct. 31, 1997
[86] PCT No.: PCT/KR97/00210
§ 371 Date: Jun. 25, 1998
§ 102(e) Date: Jun. 25, 1998
[87] PCT Pub. No.: WO98/18367
PCT Pub. Date: May 7, 1998

[30] Foreign Application Priority Data

Oct. 31, 1996 [KR] Rep. of Korea ....................... 96-38333

[51] Int. Cl.⁶ ............................... A47C 7/38; B60N 2/48
[52] U.S. Cl. ............................................ 297/408; 297/409
[58] Field of Search ...................... 297/391, 408, 297/409, 356

[56] References Cited

U.S. PATENT DOCUMENTS

| | | | |
|---|---|---|---|
| 4,304,439 | 12/1981 | Terada et al. | 297/409 |
| 4,640,549 | 2/1987 | Yokota | 297/356 |
| 4,674,792 | 6/1987 | Tamura et al. | 297/408 |
| 4,674,797 | 6/1987 | Tateyama | 297/408 |
| 4,678,232 | 7/1987 | Ishida et al. | 297/408 |
| 4,733,913 | 3/1988 | Tateyama | 297/409 |
| 5,238,295 | 8/1993 | Harrell | 297/391 |
| 5,642,918 | 7/1997 | Sakamoto et al. | 297/391 |

FOREIGN PATENT DOCUMENTS

| | | |
|---|---|---|
| 60-185510 | 9/1985 | Japan . |
| 62-137015 | 6/1987 | Japan . |
| 63-171506 | 7/1988 | Japan . |
| 1-201209 | 8/1989 | Japan . |

*Primary Examiner*—Anthony D. Barfield
*Attorney, Agent, or Firm*—Renner, Otto, Boisselle & Sklar

[57] ABSTRACT

A tilting device having a simple structure, made up of a small number of components and fabricated with few man-hours and a device for moving a headrest forward and backward which is constructed by adding a few components to this tilting device, is provided. The tilting device comprises a stay (10), a ratchet member (20) fixed to a horizontal part (11) of the stay (10), a tilt adjusting member (30) connected axially and rotatably to the horizontal part (11), a first torsion coil spring (40) connected to the horizontal part (11) of the stay (10) so that it may bias the tilt adjusting member (30) in the opposite direction to the rotation, a check member (50) so fitted axially to the tilt regulating member (30) as to engage with the ratchet member and to prevent the reverse rotation of the tilt adjusting member, a second torsion coil spring (60) so provided as to bias the check member and a cover (80) inside which the tilt adjusting member (30) is fixed. The device for forward-backward movement comprises this tilting device and a device (100) for forward-backward movement which is attached to the stay (10) of the tilting device and moves the cover (80) forward and backward.

19 Claims, 20 Drawing Sheets

6,000,760

DEVICE FOR TILTING HEADREST FOR AUTOMOBILE AND DEVICE FOR MOVING HEADREST FORWARD AND BACKWARD IN WHICH THE TILTING DEVICE IS USED

TECHNICAL FIELD

The present invention relates to a headrest tilting device for automobile for adjusting the tilt or the inclination of the headrest and a device for moving the headrest forward and backward utilizing the tilting device (herein after referred as headrest traversing device). The present invention provides a headrest tilting device with a simple structure that can be made with a small number of parts and manufacturing processes and a headrest traversing device which enables forward and backward movement of the headrest by simply adding a few parts to the headrest tilting device.

BACKGROUND OF THE INVENTION

The structures of the conventional headrest tilting device and headrest traversing device did not have any identical parts and components of the former were incompatible with those of the latter.

Moreover, the conventional devices were very complicated in their structures.

Consequently, the conventional headrest tilting device and headrest traversing device could not avoid complicated manufacturing processes, low productivity and high production costs.

The objective of the present invention, aimed to solve the above problems, is to provide a simple structured headrest tilting device and a headrest traversing device made by simply adding some parts to the above tilting device, thereby enhancing productivity and lowering manufacturing costs of the traversing device.

DISCLOSURE OF THE INVENTION

The present invention provides a headrest tilting device for automobile comprising: a stay made of a steel rod having a horizontal portion and a pair of parallel vertical portions extending from both ends of the horizontal portion; a ratchet member fixed to the horizontal portion of the stay, which is provided with a plurality of teeth and a jaw with a depression between them; a tilt adjusting member having a pair of parallel side panels, each of whose lower portion is provided with an engaging groove for pivotal engagement with the horizontal portion of the stay, wherein the inner surface of one side panel adjoins the outside surface of the ratchet member; a first torsion coil spring wound around the horizontal portion of the stay, interposing between the ratchet member and the other side panel of the tilt adjusting member, two ends of which are respectively hooked on the ratchet member and the other side panel of the tilt adjusting member; a check member having teeth to travel and engage with the teeth of the ratchet member and a jaw for interacting with the jaw of the ratchet member, which is pivobtably installed to the inner surface of one side panel of the tilt adjusting member so that the reverse rotation of the tilt adjusting member may be prevented; and a second torsion coil spring, one end of which is hung on the upper part of one side panel of the tilt adjusting member, while the other end is hooked on the upper part of the check member.

The present invention further provides a headrest traversing device for automobile comprising: a stay made of a steel rod having a horizontal portion and a pair of parallel vertical portions extending from both ends of the horizontal portion; a ratchet member fixed to the horizontal portion of the stay, which is provided with a plurality of teeth and a jaw with a depression between them; a tilt adjusting member having a pair of parallel side panels, which is in pivotal engagement with the horizontal portion of the stay; a first torsion coil spring which is arranged to bias the tilt adjusting member in the opposite direction to the rotation; a check member having teeth to travel and engage with the teeth of the ratchet member and a jaw for interacting with the jaw of the ratchet member as to prevent the reverse rotation of the tilt adjusting member; a second torsion coil spring, one end of which is hung on the upper part of one side panel of the tilt adjusting member, while the other end is hooked on the upper part of the check member; and a back and forth movement device mounted on the horizontal portion of the stay, which is arranged to move a cover which accommodates the tilt adjusting member and the horizontal portion of the stay therein; and a mobile shaft passing through the upper portion of the tilt adjusting member, both ends of which are fixed at the back and forth movement device.

As described above, the present invention provides a headrest tilting device with a simple structure that can be made with a small number of parts and manufacturing processes and a headrest traversing device which is arranged to move the headrest back and forth by simply adding a few parts to the above tilting device.

BRIEF DESCRIPTION OF DRAWINGS

FIG. 2b is an enlarged cross sectional view along the A—A line of FIG. 2a.

FIG. 6b is a partial cutaway plan view of the tilting device of FIG. 6a;

DESCRIPTION OF THE REFERENCE NUMERAL IN THE DRAWINGS

Figure 1:
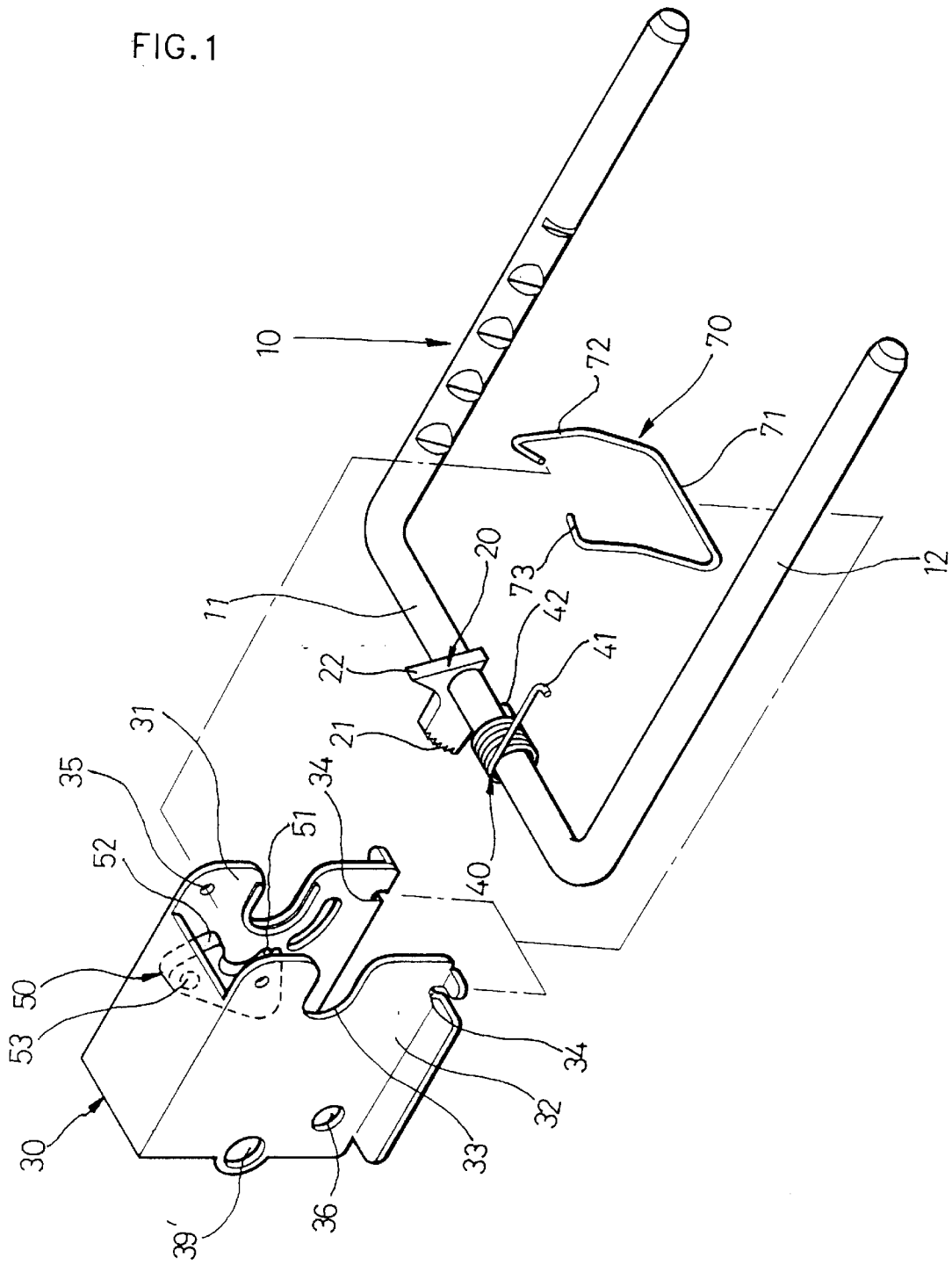
FIG. 1 is an exploded perspective view of a headrest tilting device according to the first embodiment of the present invention.
Figure 2A:
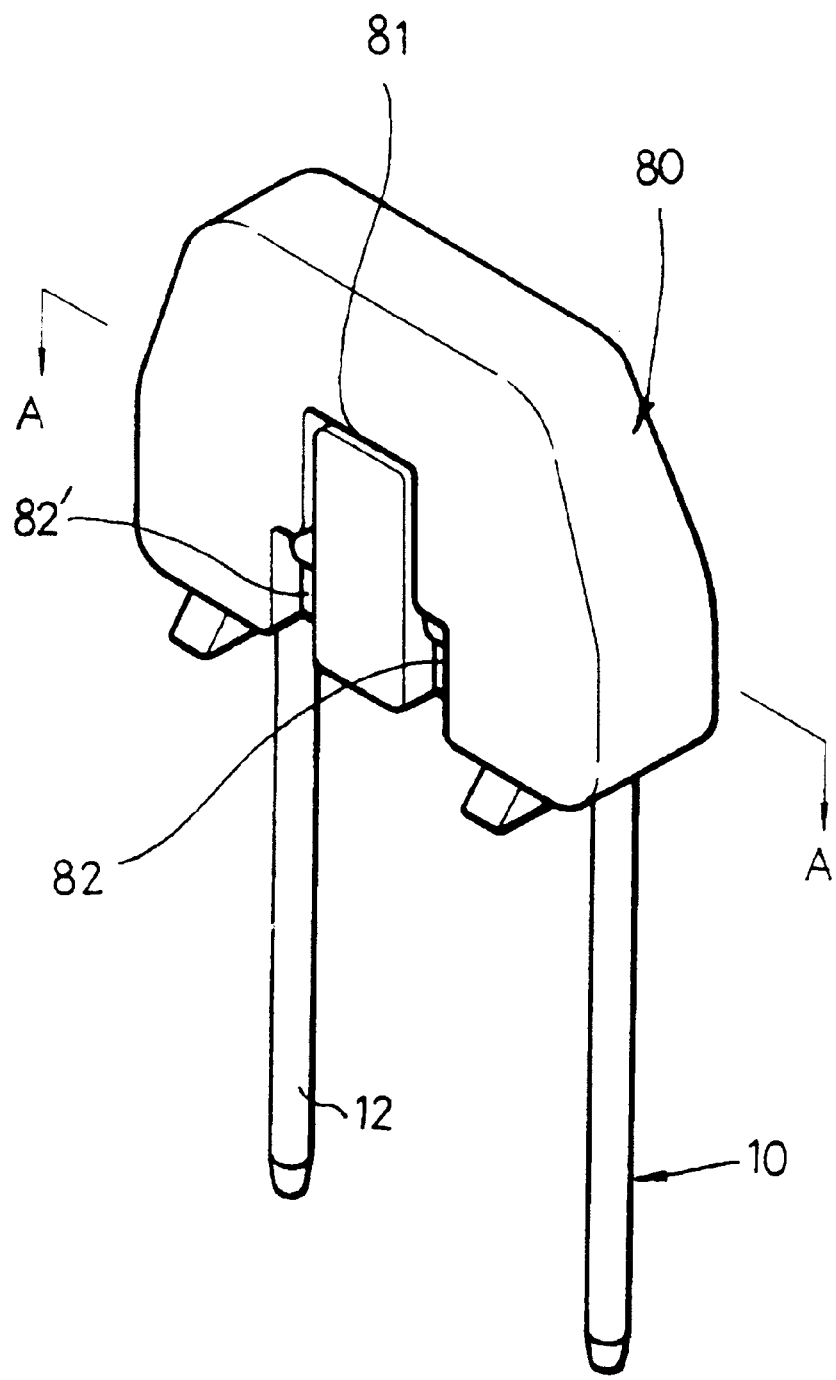
FIG. 2a is a perspective view of the tilting device of FIG. 1 provided with a cover.
Figure 2B:
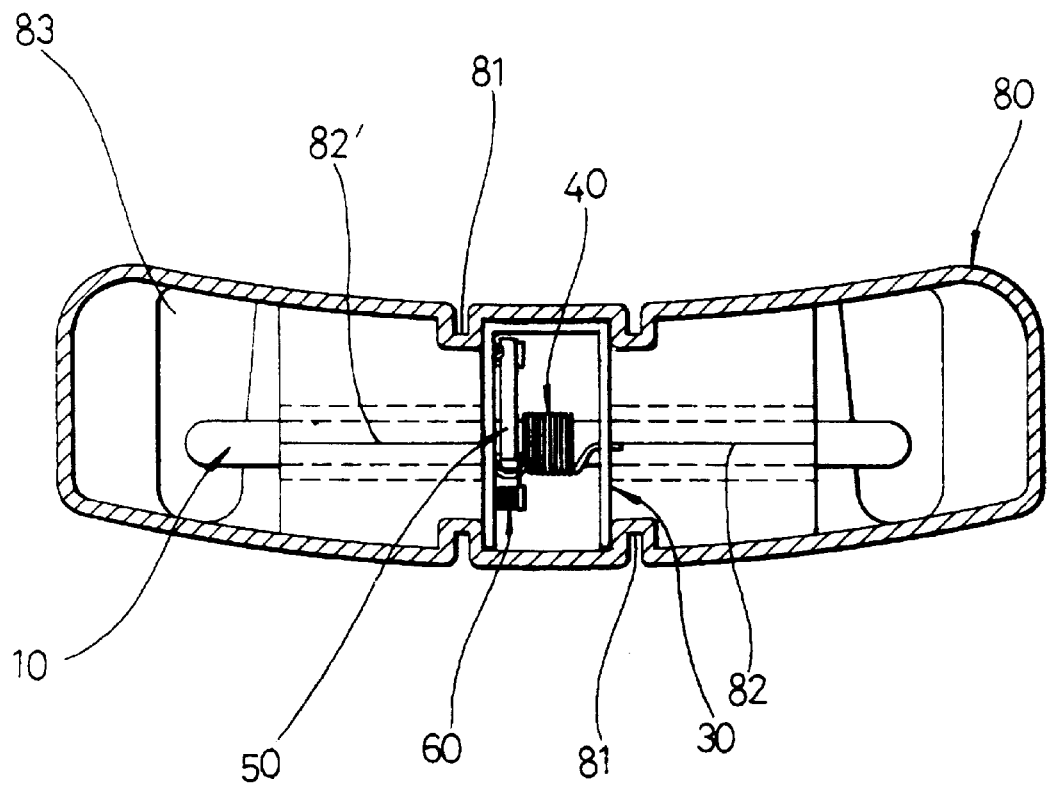

10:Stay
    11:Horizontal portion
    12:Vertical portion
20:Ratchet member
    21:Teeth    22:Jaw
30:Tilt adjusting member
    31,32:Side panel    33:Engaging groove -continued 34:Hanging groove 35:Hanging hole
30a, 30b:Panel
301:Pivot hole
40:First torsion coil spring
50:Check member
  51:Teeth
60:Second torsion coil spnng
70:Fixing member
  71:Intermediate portion
  72:Parallel portion 73:End
80:Cover
  81:Protrusion
  82, 82':Receiver
100:Back and forth movement device
  110, 110':Bracket 130, 130':Lever
140, 140':Lever 150, 150':Mobile panel
160:Mobile shaft
170, 170':Coil spring

PREFERRED EMBODIMENTS OF THE INVENTION

The following is a detailed description of the preferred embodiments of the present invention made with reference to the accompanying drawings.

(Embodiment 1)

FIGS. 1 through 4 are drawings of a headrest tilting device according to the first embodiment of the present invention. As shown in the drawings, the tilting device comprises: a stay 10; a ratchet member 20 fixed to the horizontal portion 11 of the stay 10; a tilt adjusting member 30, the lower portion of which is in pivotal engagement with the horizontal portion 11 of the stay 10 and the inner surface of the first side panel 31 of which adjoins the outside surface of the ratchet member, wherein the tilt adjusting member 30 pivots upon the horizontal portion 11; a first torsion coil spring 40 wound around the horizontal portion 11 with the two ends 41 and 42 hung on a second side panel 32 of the tilt adjusting member 30 and the ratchet member 20 respectively, interposing between the ratchet member 20 and the inner surface of the second side panel 32 of the tilt adjusting member 30 so that it may prevent the tilt adjusting member 30 from moving to and fro on the horizontal portion; a check member 50 provided with teeth 51 and a jaw 52 and attached to the side panel 31 of the tilt adjusting member 30, the teeth 51 of which are arranged to travel and engage with the teeth 21 of the ratchet member 20 and the jaw 52 interacting with the jaw 22; and a second torsion coil spring 60 with one end 61 hung on the upper part of the side panel 31 of the tilt adjusting member 30 and the other end hooked on the check member 50.

The stay 10 is formed by bending a steel bar into a "⊓" shape and the ratchet member 20 is fixed to the horizontal portion 11 of the stay 10.

The tilt adjusting member 30 is made by bending a steel panel into a " ⊏ " shape to have two parallel side panels 31 and 32, the lower middle portions of which are respectively provided with an engaging groove 33 for receiving the horizontal portion 11 of the stay 10 in addition to hanging grooves 34 and hanging holes 35 formed oppositely to each other.

The tilt adjusting member 30 and the stay 10 are pivotably engaged by inserting the horizontal portion 11 of the stay 10 into the engaging grooves 33 formed on the side panels 31 and 32 and hanging the intermediate portion 71 of a fixing member 70—made of a " ⊏ " shaped steel wire—on both of the hanging grooves 34, then attaching the parallel portions 72 to upwardly support the horizontal portion 11 of the stay 10 and inserting the inwardly bent ends 73 into the corresponding hanging holes 35.

Accordingly, the tilt adjusting member 30 is pivotably engaged on the horizontal portion 11 by the fixing member 70.

A hanging hole 36 is formed at the upper portion of the second side panel 32 in which one end 41 of the first torsion coil spring 40 is hooked and a hanging hole 37 is provided at the upper portion of the first side panel 31 for hanging one end 61 of the second torsion coil spring 60.

Further, a stop piece 38 is projected on the inner surface of the first side panel 31 to control the degree of the upward pivoting movement of the check member 50.

Moreover, the check member 50 is attached to the first side panel 31 by a pivot pin 53 and a hanging hole 54 is formed at its upper portion to receive the other end 62 of the second torsion coil spring 60.

The resulting tilting device is then placed and fixed in a plastic cover 80.

The tilt adjusting member 30 is firmly fixed in the cover 80 with its verge received and fixed between the protrusions 81 which are formed on the front and back sides of the cover 80 and its lower edge blocked by the opposing inwardly extended bottom walls of the cover 80 formed above the half-circle receivers 82 and 82'.

The left and right sides of the horizontal portion 11 of the stay 10 carrying the tilt adjusting member 30 are wrapped by the receivers 82 and 82' and both of the vertical portions 12 are exposed out of the openings 83 formed at the bottom of the cover 80.

Figure 4:
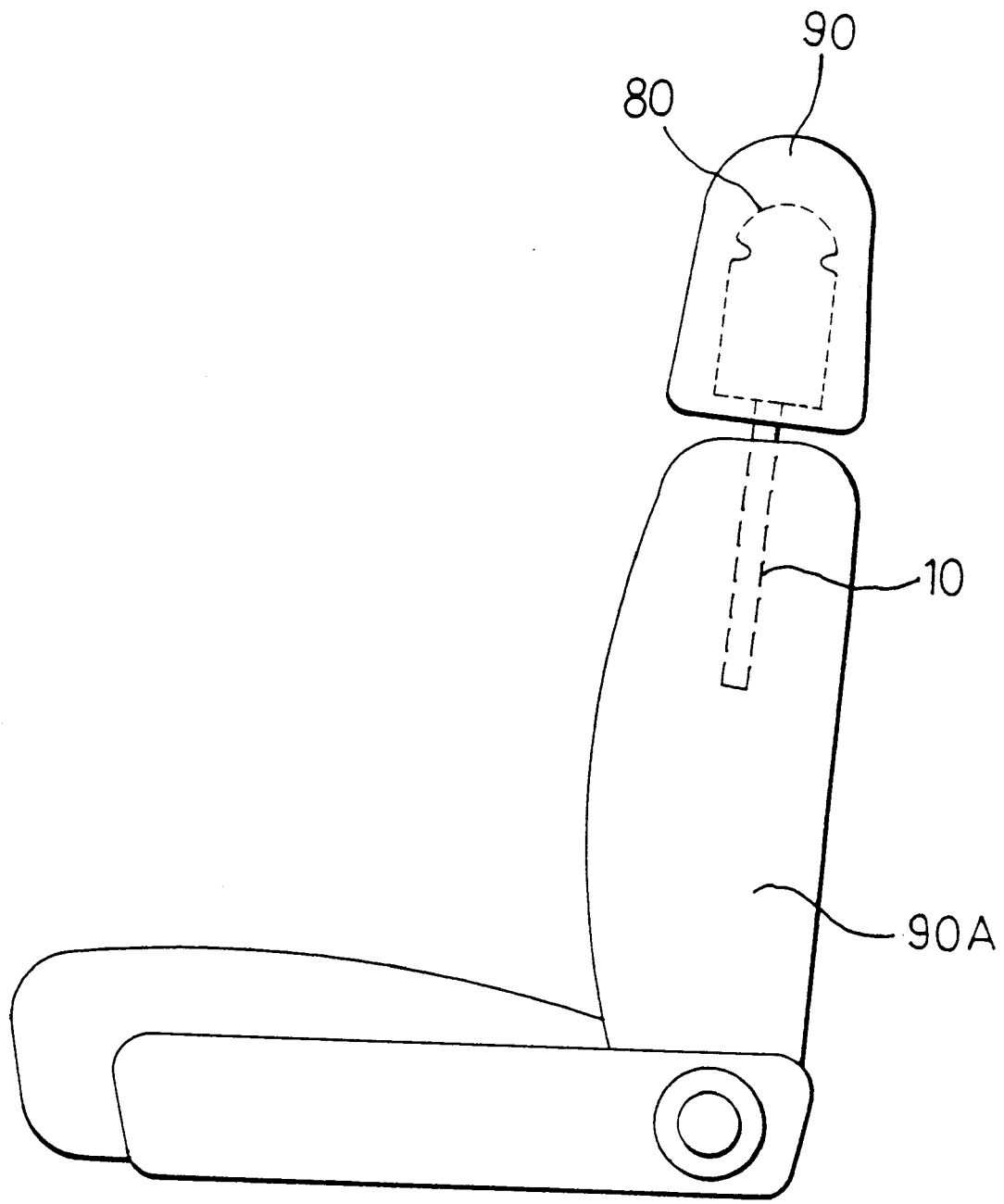
FIG. 4 is a side view of a seat of an automobile on which a headrest with the tilting device is mounted.

The cover 80 is fixed in a headrest 90 and as illustrated in FIG. 4, the exposed vertical portions 12 are inserted into the holes formed in the upper portion of a backrest 90a of an automobile seat.

Accordingly, the headrest is mounted on top of the backrest 90a by utilizing the stay 10.

The following is an explanation of the operation of the tilting device according to the first embodiment of the present invention.

Figure 3A:
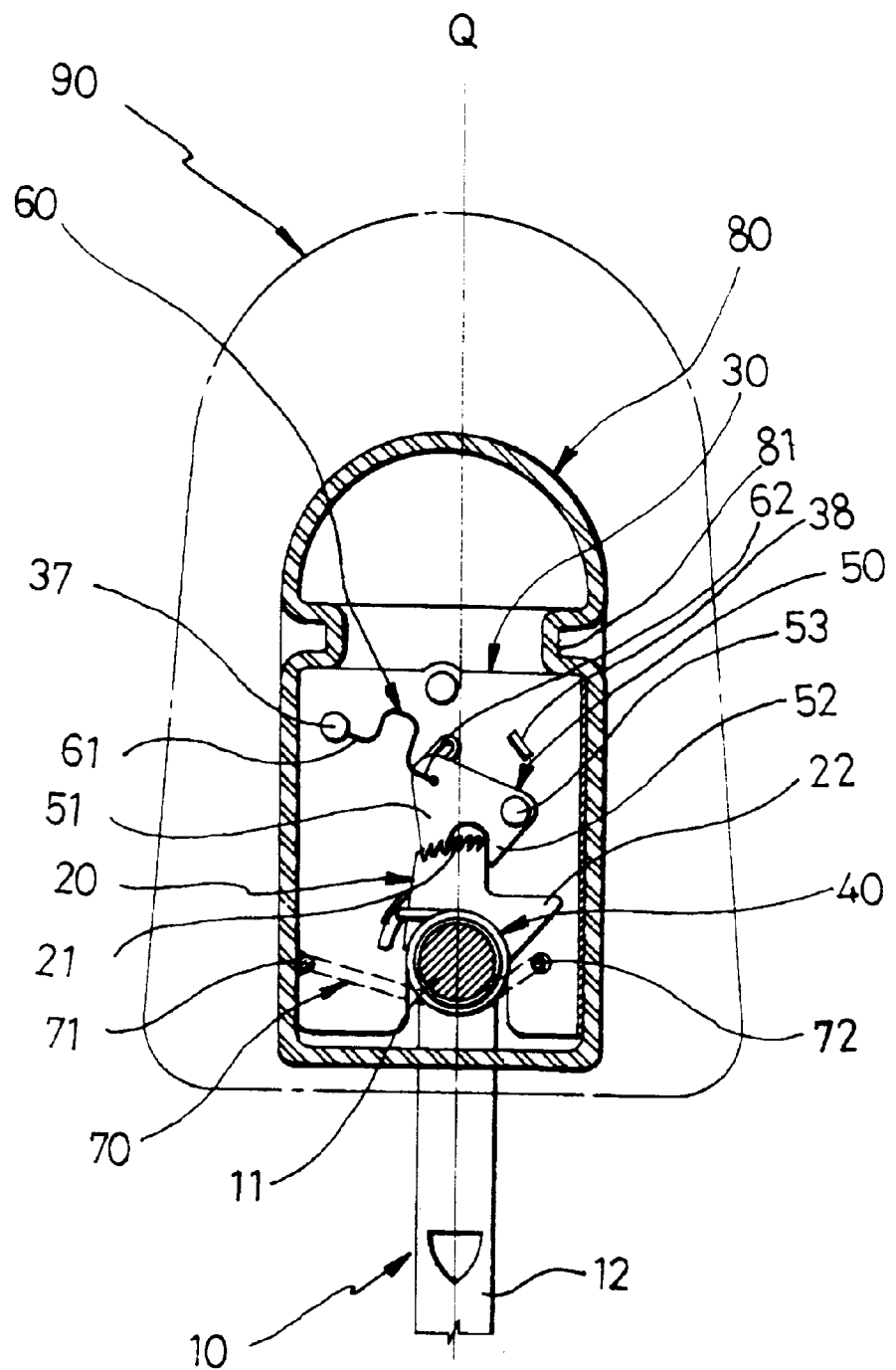
FIG. 3a through 3d are side sections illustrating the operation of the tilting device according to the first embodiment of the present invention

As seen in FIG. 3a, when the cover 80 stands up-right(Q), the teeth 51 of the check member 50 are engaged with the front teeth 21 of the ratchet member 20.

Figure 3B:
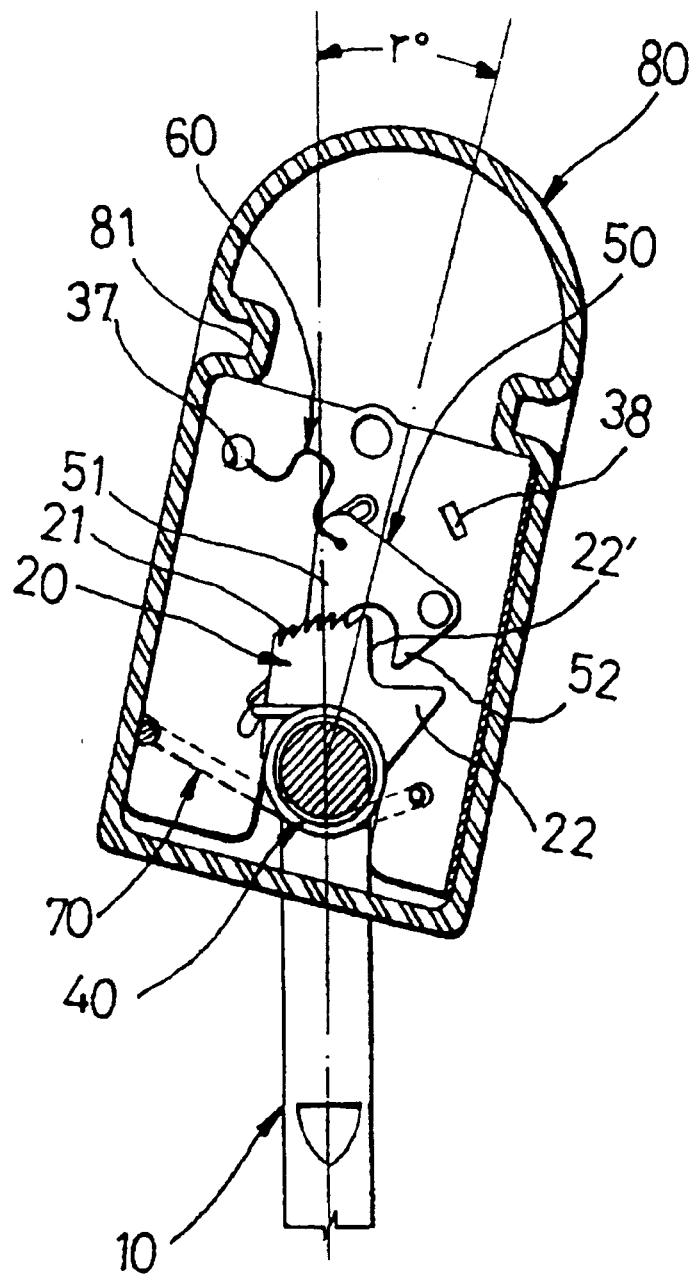

Then, as seen in FIG. 3b, when the cover 80 is pushed backward by a certain angle r°, the tilt adjusting member 30 pivots simultaneously upon the horizontal portion 11 of the stay 10, the check member 50 on the first side panel 31 also pivots to the same extent and the intermediate teeth 51 are engaged with the teeth 21 of the ratchet member 20.

At this moment, repulsive force is produced by the first torsion coil spring 40 as the tilt adjusting member 30 is pivoted backward and the first torsion coil spring tends to put the tilt adjusting member 30 to the original position(Q). Because the teeth 51 biased by the second torsion coil spring 60 are engaged with the teeth of the ratchet member, the tilt adjusting member 30 cannot return to the original state(Q) and consequently, the cover 80 remains in the tilted position.

As described above, the tilted angle of the cover 80 can be adjusted as being proportional to the number of the teeth 21 traveled by the teeth of the check member.

Figure 3C:
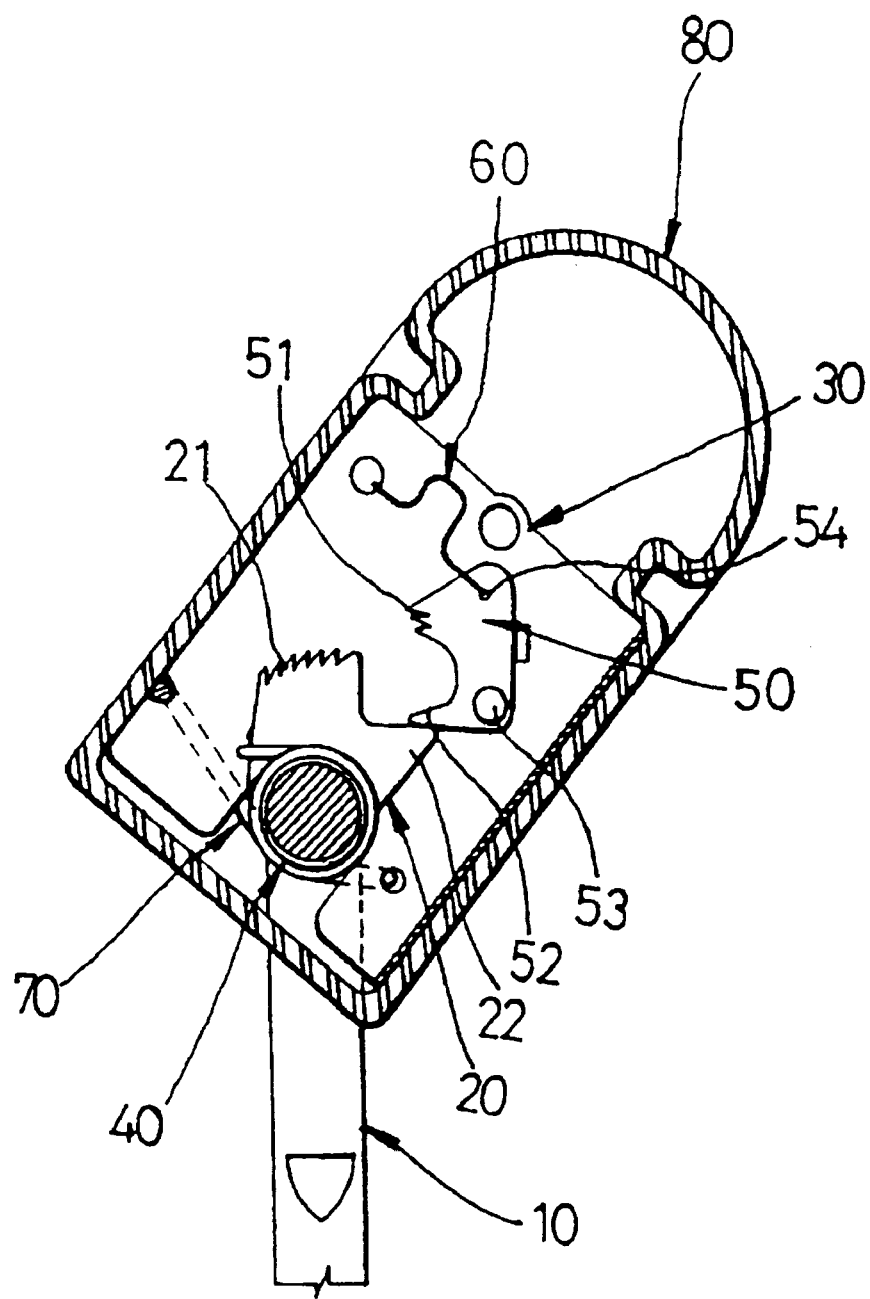

When the cover 80 is to be returned to its up-right position(Q), the cover 80 is to be further pushed backward, as shown in FIG. 3c.

Thus, the jaw 52 of the check member 50 are blocked and pushed clockwise by the jaw 22 of the ratchet member 20, making the check member 50 pivoted clockwise and remain at that state and ultimately isolating the teeth 51 from the teeth 21.

The other end 62 of the second torsion coil spring 60 biases the check member 50 upwardly, preventing the check member from pivoting downwardly and thus the repulsive force of the compressed first torsion coil spring 40 is increased to its full extent.

When the force pushing the cover 80 backward is eliminated, the repulsive force of the first torsion coil spring 40 rotates the tilt adjusting member 30 towards the up-right position(Q).

Figure 3D:
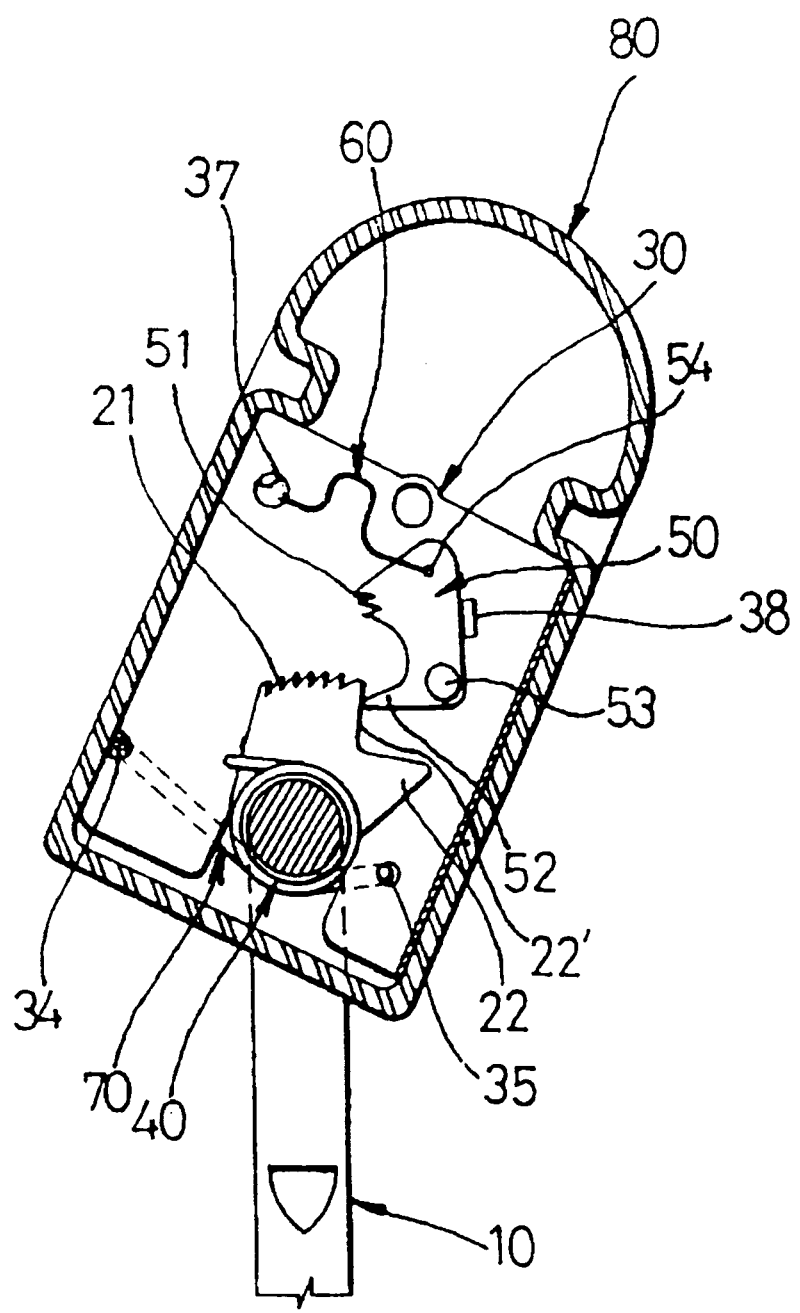

This rotation is made smoothly since the teeth 51 and the teeth 21 are isolated from each other. In this course, as illustrated in FIG. 3d, when the jaw 52 of the check member 50 meet the other jaw 22' of the ratchet member 20, the check member 50 is downwardly rotated and thus returned to the original position, thereby putting the tilt adjusting member 30 to the up-right position. Thus, the cover 80 is returned to its original up-right position as illustrated in FIG. 3a.

(Embodiment 2)

Figure 5:
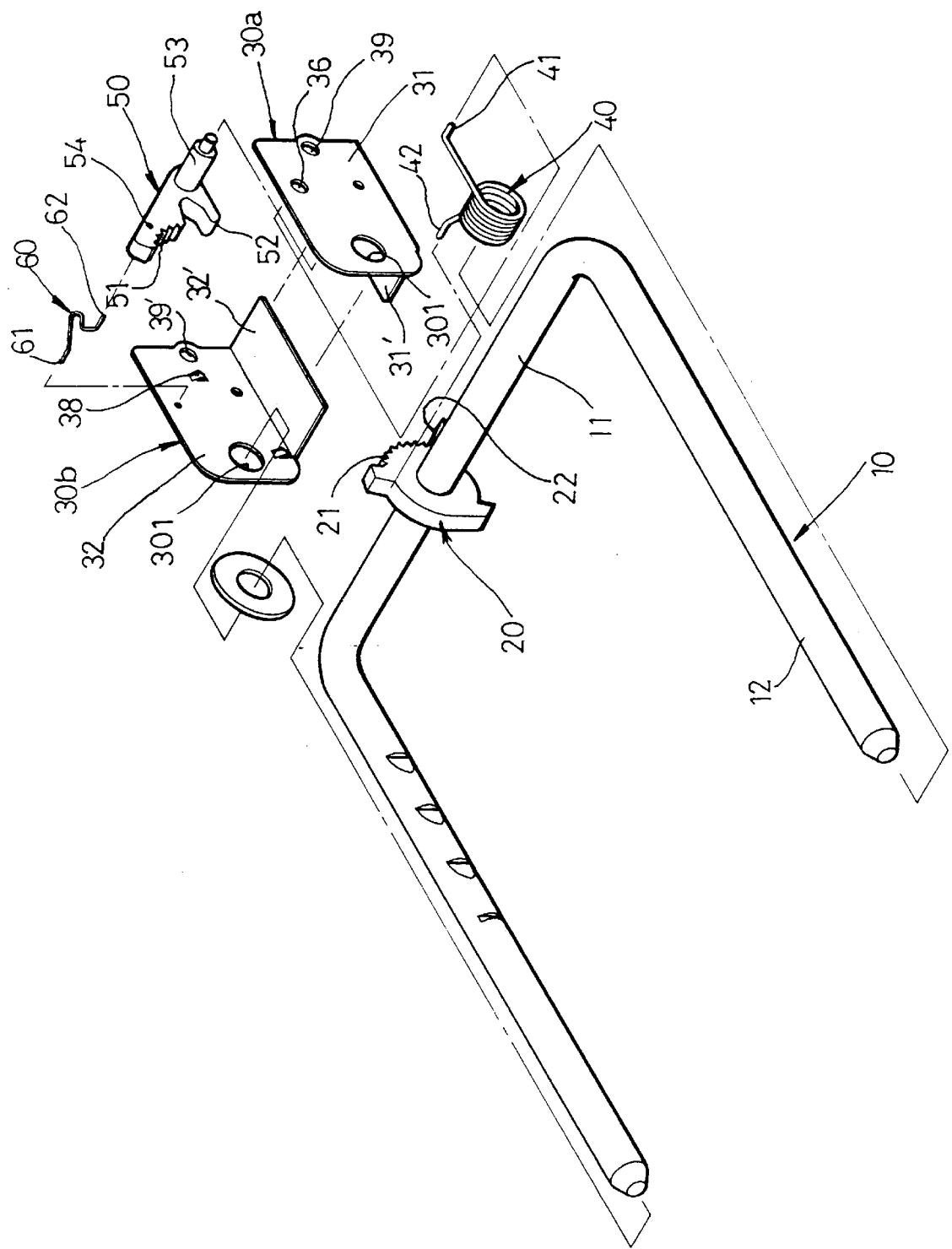
FIG. 5 is an exploded perspective view of a headrest tilting device according to the second embodiment of the present invention.
Figure 6A:
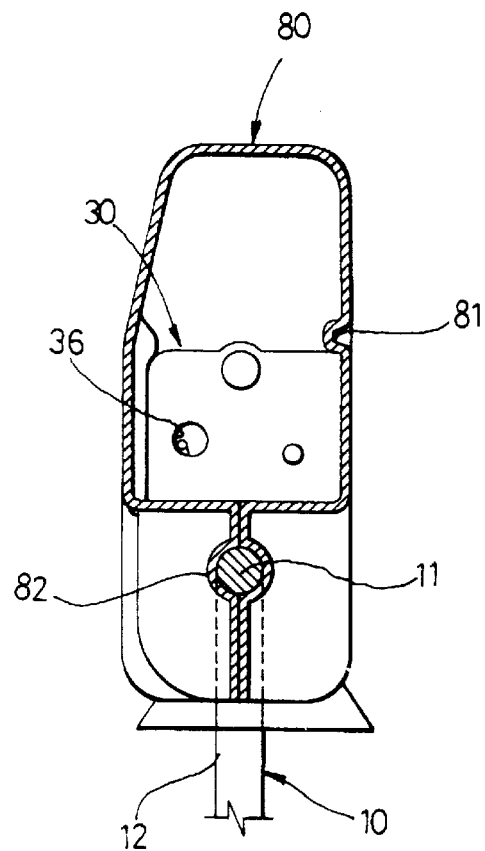
FIG. 6a is a partial cutaway side view of the tilting device of FIG. 5 fixed in a cover.
Figure 6B:
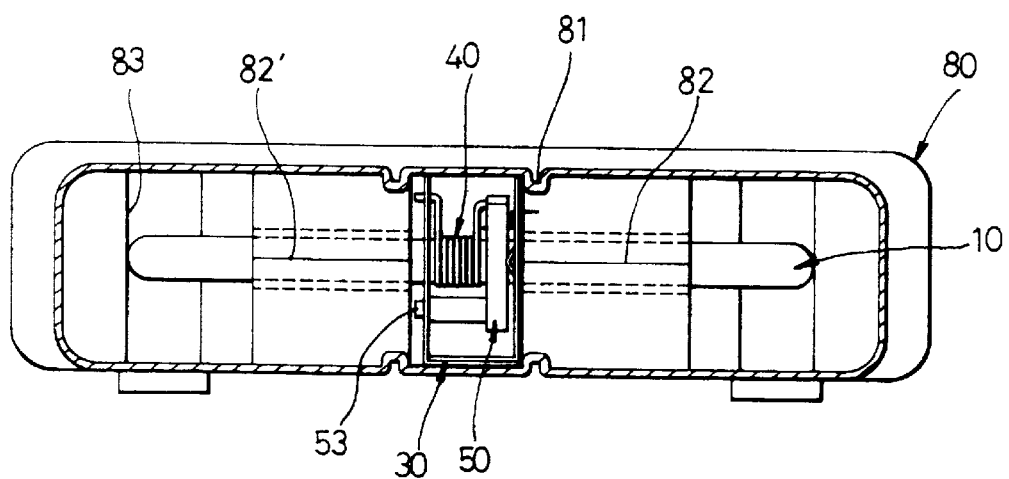

FIGS. 5 through 7 are drawings illustrating the structure and the operation of a headrest tilting device according to the second embodiment of the present invention.

The tilting device of the second embodiment is identical with that of the first embodiment to the extent that it includes: a stay 10; a ratchet member 20 fixed to the horizontal portion 11 of the stay 10; a tilt adjusting member 30, the lower portion of which is in pivotal engagement with the horizontal portion 11 of the stay 10; a first torsion coil spring 40 wound around the horizontal portion 11, which biases the tilt adjusting member 30 a check member 50, which is pivotably attached to the inner surface of the first side panel 31 of the tilt adjusting member 30 so that it may be engaged with the ratchet member 20 and prevent the reverse rotation of the tilt adjusting member 30; and a second torsion coil spring 60 which prevents the reverse rotation of the check member 50.

The second embodiment differs from the first embodiment in the structures of the ratchet and check members and the tilt adjusting member 30 according to the second embodiment is composed of two separate panels 30a and 30b.

Specifically, a plurality of teeth 21 are formed at the upper periphery of the ratchet member 20, while a pair of jaws 22 and 22' are upwardly formed next to the outermost teeth 21.

The check member 50 is pivotably attached to the tilt adjusting member 30 by a pivot 53 and a plurality of teeth 51 and a jaw 52 are protruded separately by a certain gap. The teeth 51 are arranged to engage with the teeth 21 and the jaw 22 moves to and fro in the space between the teeth 51 and the jaw 52.

The panels 30a and 30b for making the tilt adjusting member are "¬" shaped in section and pivot holes 301 are formed respectively in their lower middle portions.

The vertical portions 12 of the stay 10 are inserted respectively through each of the pivot holes 301 of the side panels 30a and 30b and the panels are slided toward the horizontal portion 11 so that they may accept the ratchet member 20 and the first torsion coil spring 40 therebetween. Two connecting portions 31' and 32' of the panels 30a and 30b are then put one upon another and welded together.

Accordingly, the panels 30a and 30b makes a tilt adjusting member 30 in a "Π" shape in section, which is pivotably mounted on the horizontal portion 11 of the stay 10.

One end 41 of the first torsion coil spring 40 is held in the hanging hole 36 formed on the panel 30a and the other end 42 hooked on the opposite side of the jaw next to the front teeth 21 of the ratchet member 20.

Since the tilt adjusting member 30 is in pivotal engagement with the horizontal portion 11 of the stay 10 by means of the pivot holes 301 formed on the panels 30a and 30b, the fixing member 70 used in the first embodiment is unnecessary in the second embodiment with a more stable pivotal engagement.

Identical to the first embodiment, the tilt adjusting member is fixed in a cover 80 and the vertical portions 12 of the stay 10 are exposed out of the cover 80 which is placed in the headrest 90a.

Figure 7A:
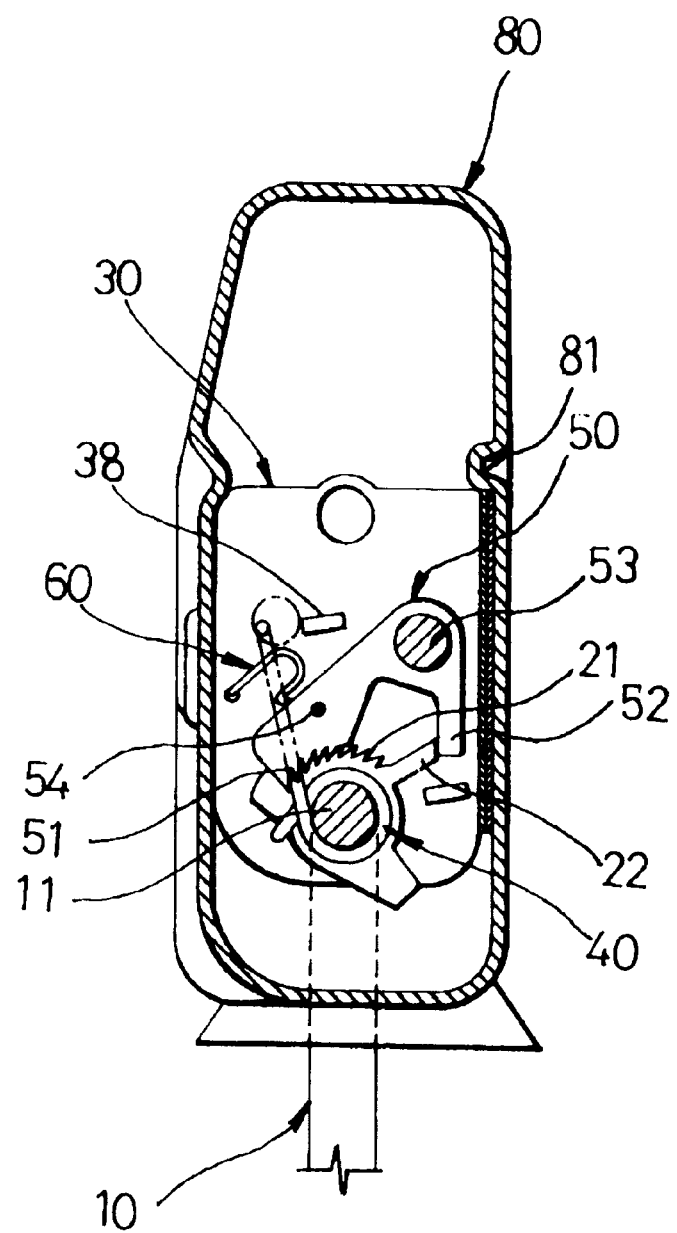
FIG. 7a through 7d are side sectional views illustrating the operation of the tilting device according to the second embodiment of the present invention.
Figure 7B:
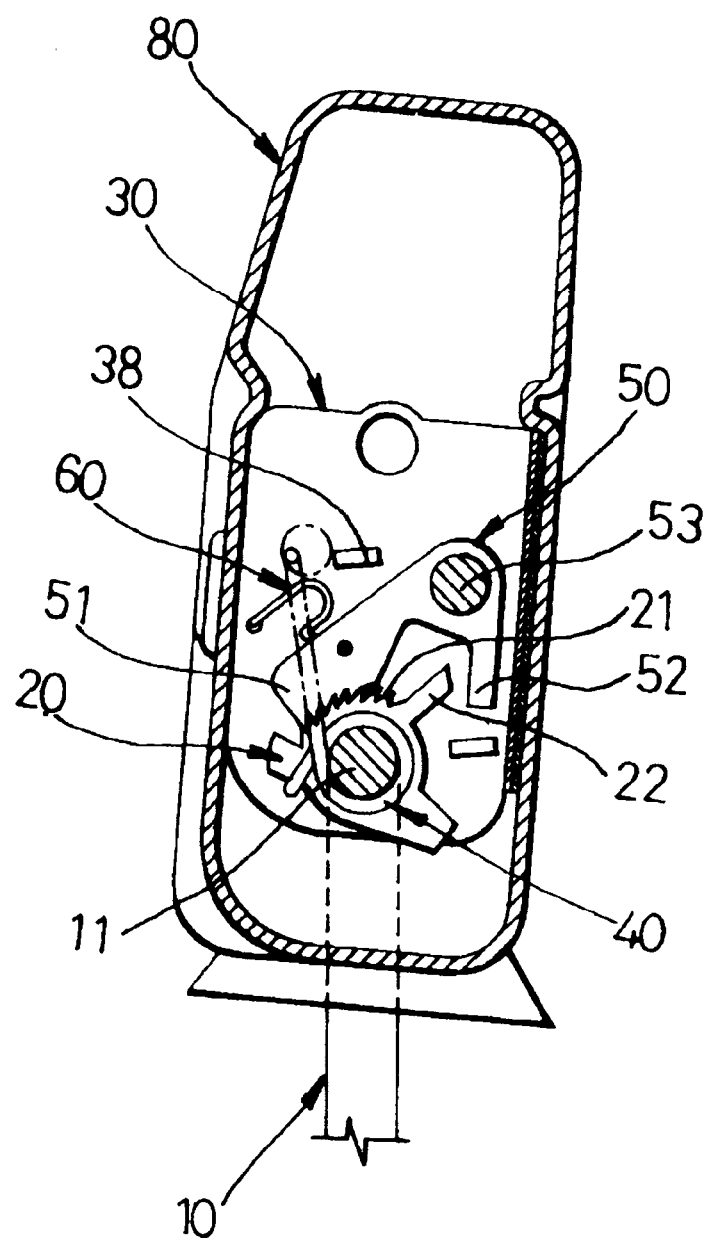
Figure 7C:
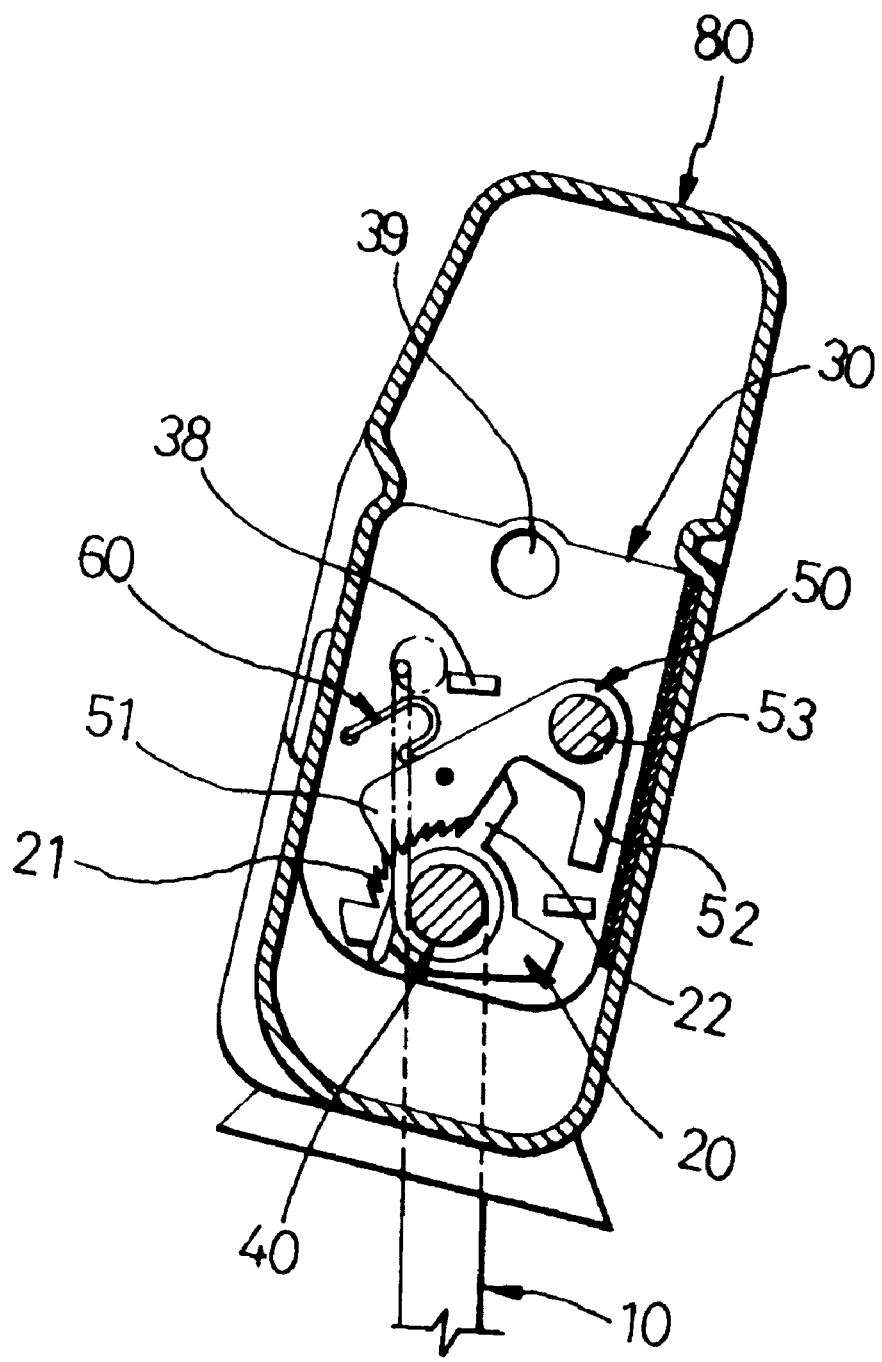
Figure 7D:
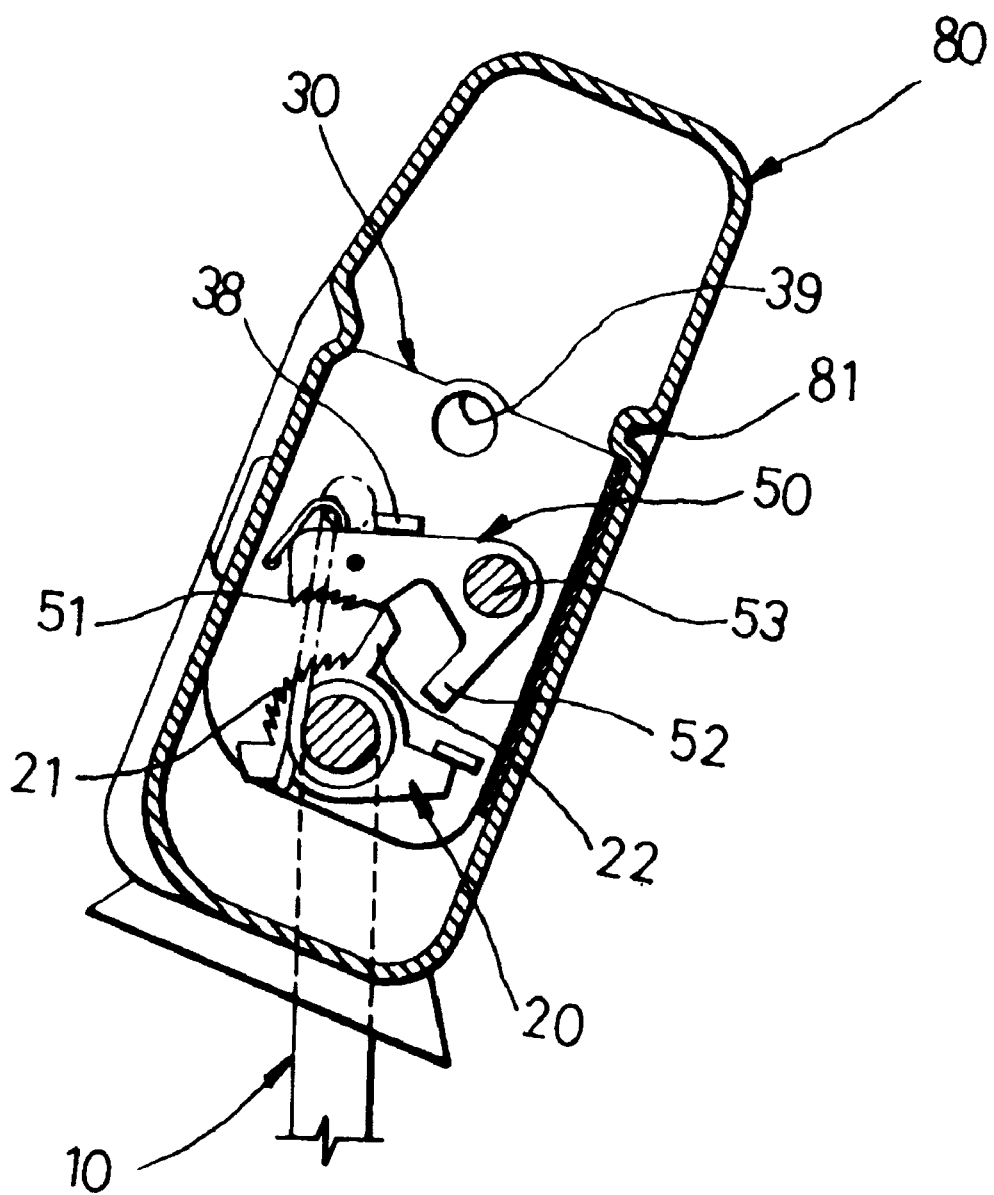

The operation of the tilting device according to the second embodiment is almost identical to that of the first embodiment. As illustrated in FIG. 7d, to return the cover 80 to the original up-right position, the cover 80 has to be pushed backward all the way.

By doing this, the jaw 22 of the ratchet member 20 pushes up the rear portion of the teeth 51, making the check member 50 pivoted clockwise and the teeth 51 isolated from the teeth 21.

At this moment, since the other end 62 of the second torsion coil spring 60 is hung on the check member 50, the resilient force accumulated and exerted by the second torsion coil spring 60 prevents the check member 50 from rotating in the downward direction. Also, the repulsive force of the first torsion spring 40 is accumulated to the maximum since it is compressed to the maximum.

When the force pushing the cover 80 backward is eliminated, the resilient force accumulated in the first torsion coil spring 40 is released, thus rotating the tilt adjusting member 30 toward the upright position.

This rotation can be achieved smoothly since the teeth 51 and the teeth 21 are in the positions isolated from each other. In such rotation, when the jaw 52 of the check member 50 meets the jaw 22 of the ratchet member 20, the check member 50 is rotated counterclockwise and thus returned to the original position, thereby putting the tilt adjusting member 30 to the up-right position. Thus, the cover 80 is returned to its original upright position as illustrated in FIG. 7a.

(Embodiment 3)

Figure 8:
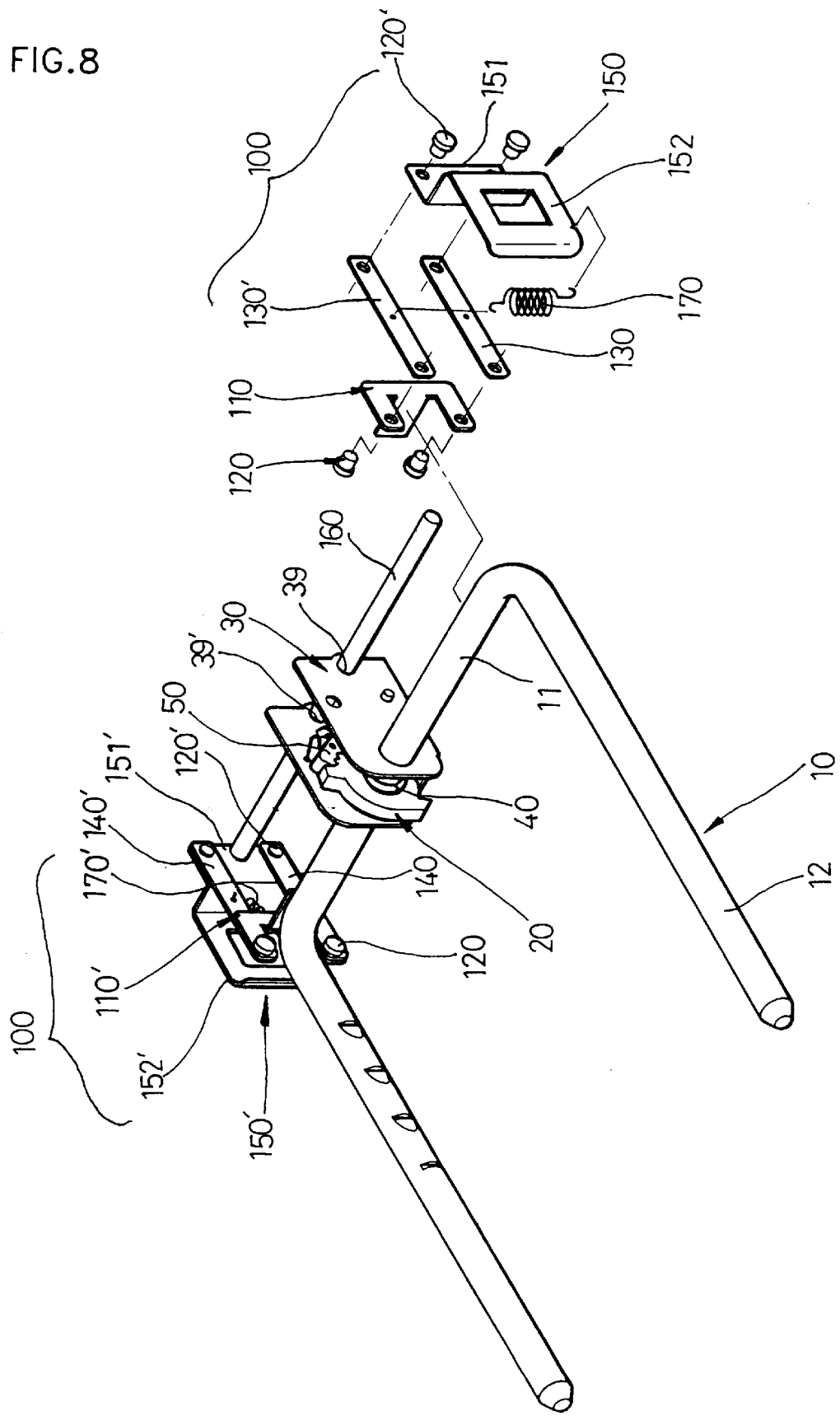
FIG. 8 is a partially exploded perspective view of a headrest traversing device according to the third embodiment of the present invention.
Figure 9:
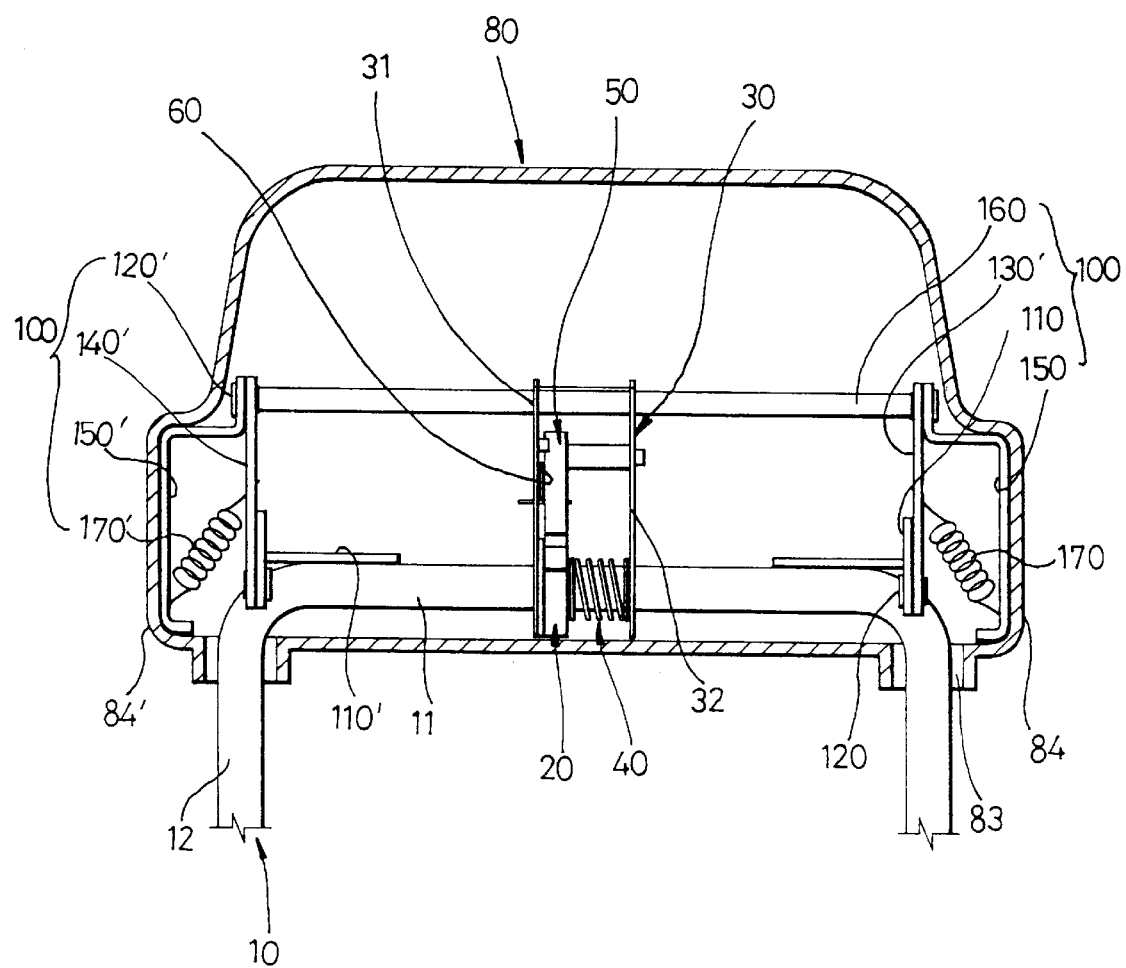
FIG. 9 is a partial cutaway rear view of the headrest traversing device of FIG. 8 fixed in a cover; an FIG. 10a through 10d are side sectional views illustrating the operation of the headrest traversing device of FIG. 8.

FIGS. 8 through 10 are drawings of a headrest traversing device according to the third embodiment of the present invention. This device is manufactured by adding a back and forth movement device to the tilting device as described in the first and second embodiments. This device enables forward and backward movement of headrest as well as locking of the headrest in the traveled positions.

The headrest traversing device according to the third embodiment of the present invention is made by adding a back and forth movement device 100 to the headrest tilting device of the first or second embodiment which comprises: a stay 10; a ratchet member 20 fixed to the horizontal portion 11 of the stay 10; a tilt adjusting member 30, the lower portion of which is in pivotal engagement with the horizontal portion 11 of the stay 10; a first torsion coil spring 40 wound around the horizontal portion 11, which biases the tilt adjusting member 30 in the opposite direction to its rotation; a check member 50 in engagement with the ratchet member, the lower portion of which is pivotably attached to the inner surface of a first side panel 31 of the tilt adjusting member 30 so that the check member may prevent the tilt adjusting member from being rotated; and a second torsion coil spring 60 which prevents the unintended rotation of the check member 50.

The back and forth movement device 100 comprises: a pair of brackets 110 and 110', the horizontal extensions of which are opposedly fixed on the horizontal portion 11 of the stay 10; a pair of levers 130 and 130' and the other pair of levers 140 and 140' in pivotal engagement with the front and back legs of the corresponding brackets 110 and 110' through lower pivot pins 120; a pair of mobile panels 150 and 150', the corresponding upper portions 151 and 151' of which are in pivotal engagement with the respective pair of the levers 130 and 130' or 140 and 140' through their respective upper pivot pins 120' and lower portions 152 and 152' of which are outwardly and downwardly bent so as to be isolated from and parallel to their respective pair of the levers 130 and 130' or 140 and 140'; a mobile shaft 160, which is inserted through the pivot holes 39 and 39' on the side panels 31 and 32 for the pivotal engagement with the tilt adjusting member and both ends of which are fixed at the middle of the upper portions 151 and 151' of the mobile panels 150 and 150'; a pair of coil springs 170 and 170' whose upper ends are hooked on the middle of the corresponding levers 130' and 140' and whose lower ends are fixed to the corresponding lower front portions of the mobile panels 150 and 150', wherein the coil springs 170 and 170' pull their respective mobile panels 150 and 150' forward.

When installing the headrest traversing device inside the cover 80, unlike the headrest tilting device of the first or second embodiment, the tilt adjusting member 30 is not fixed in the cover. Rather, only the outwardly curved lower portions 152 and 152' of the mobile panels 150 and 150' are locked in a room defined by the fixing portions 84 and 84' outwardly protruded on both sides of the cover 80.

Accordingly, the cover 80 moves forward or backward together with the lower portions 152 and 152' of the mobile panels 150 and 150' and the tilt adjusting member 30 is pivoted in the cover 80.

A certain space is so provided in the cover 80 as to prevent the front and back portions of the tilt adjusting member 30 from being contacted with the walls of the cover 80 during the back and forth movement of the headrest.

The following is an explanation of the operation of the headrest traversing device according to the third embodiment of the present invention.

Figure 10A:
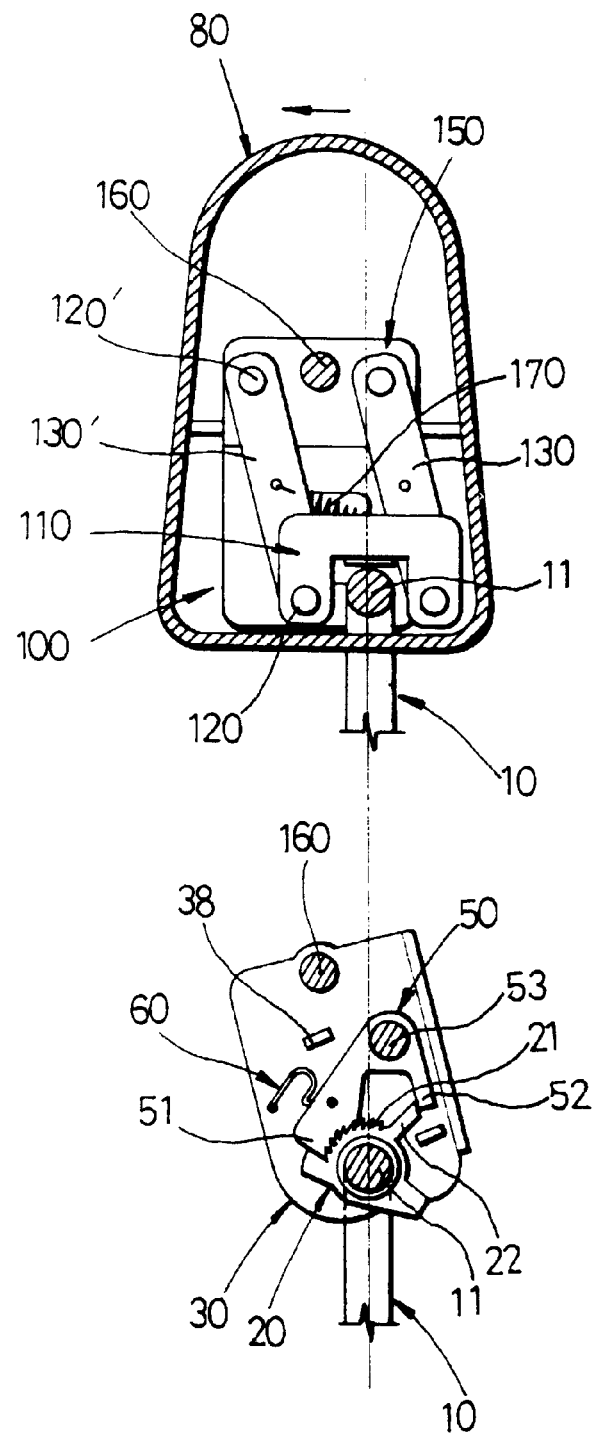

As illustrated in FIG. 10a, when the teeth 51 of the check member 50 are engaged with the front teeth 21 of the ratchet member 20, the mobile panels 150 and 150' of the back and forth movement device 100 are located in front of the stay 10.

Figure 10B:
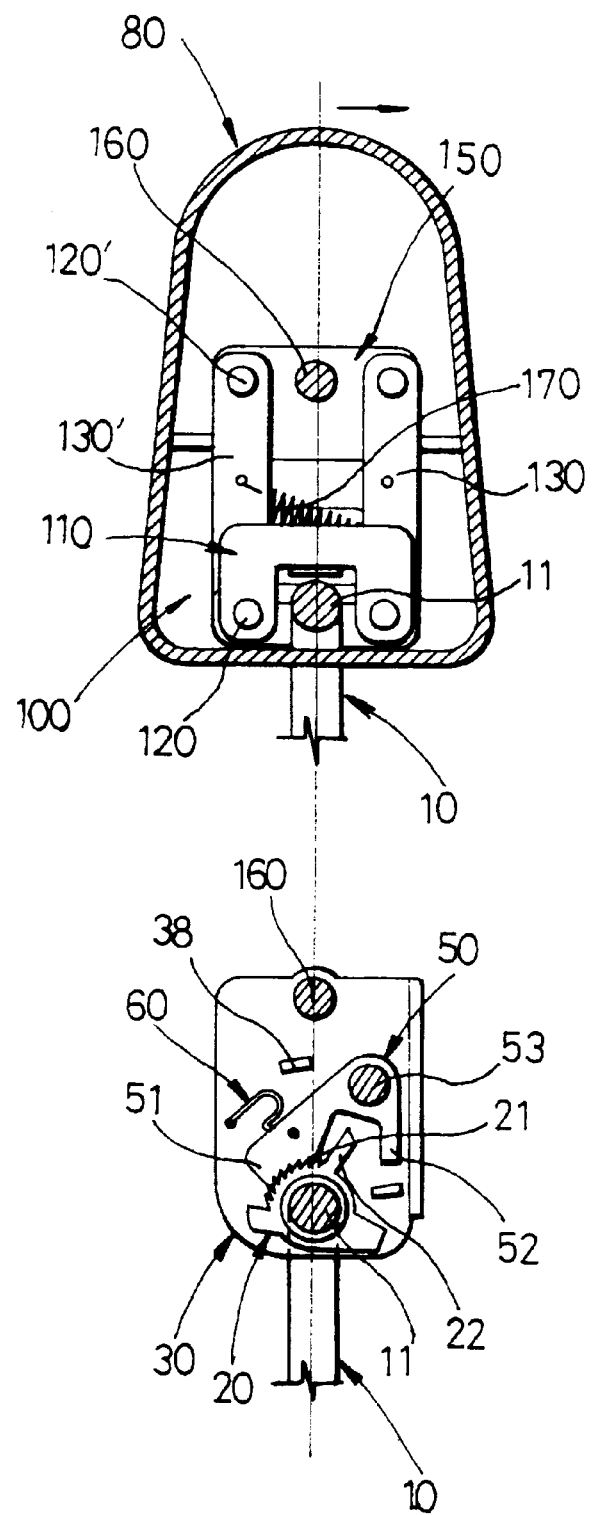
Figure 10C:
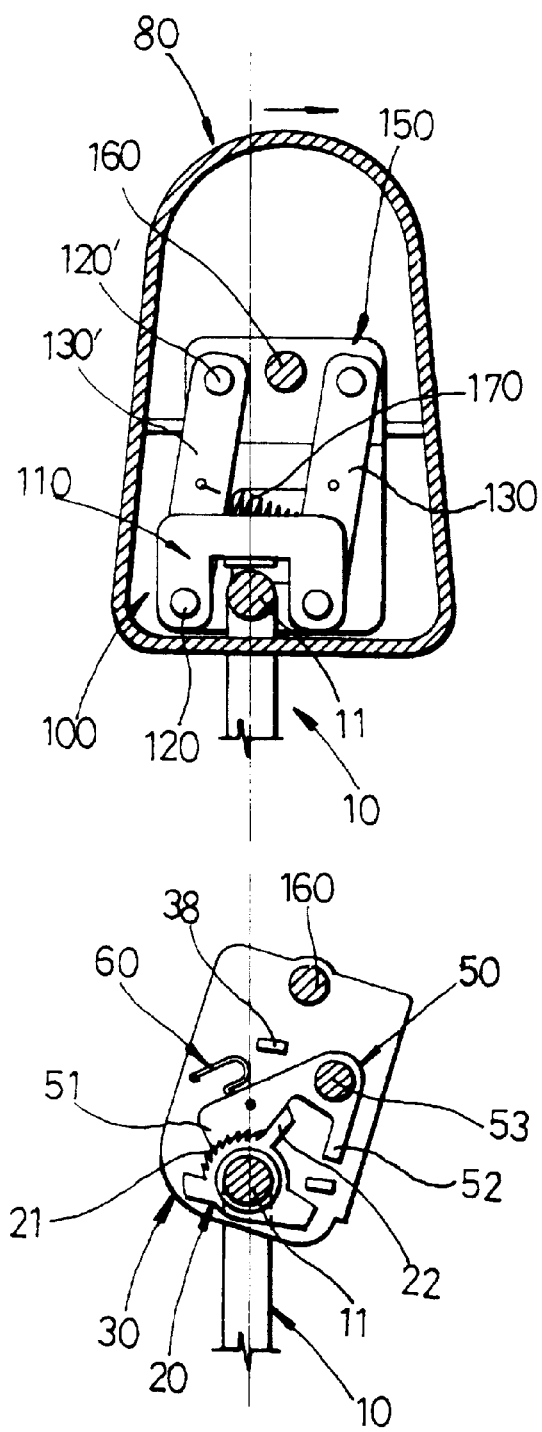

As illustrated in FIG. 10b, when the cover 80 is pushed backward, the mobile panels 150 and 150', carried by the cover, are moved backward simultaneously, because their lower portions 152 and 152' are respectively fixed in the fixing portions 84 and 84' on both sides of the cover 80.

Accordingly, since the mobile panels 150 and 150' and the brackets 110 and 110' fixed respectively at the both end portions of the horizontal portion 11 of the stay 10 are in pivotal engagement with each other by means of the respective pair of the levers 130 and 130' or 140 and 140', the mobile panels 150 and 150' are moved backward by the actions of the respective pair of the pivot pins 120 and 120' which are common for the respective pair of the levers 130 and 130' or 140 and 140', the bracket 110 or 110' and the mobile panel 150 or 150'. Thus, the cover can be moved backward.

Also, since the both ends of the mobile shaft 160 are fixed to the upper middle portion of the corresponding mobile panels 150 and 150' and the mobile shaft 160 is arranged to pass through the pivot holes 39 and 39' on the side panels 30a and 30b of the tilt adjusting member 30, the upper portion of the tilt adjusting member moves along the path of the mobile shaft 160.

At this stage, the lower portion of the tilt adjusting member 30 is pivoted upon the horizontal portion 11, since it is in pivotal engagement with the horizontal portion 11.

When the tilt adjusting member 30 is pivoted in this manner, the teeth 51 of the check member 50 escape from the front part of the teeth 21 and engage with the intermediate or rear part of the teeth 21 in proportion to the extent of such pivoting movement. Simultaneously, the first torsion coil spring 40 is compressed in proportion to such pivotal movement since one of its ends 41 is held in the hanging hole 36.

Accordingly, the repulsive force—the force that tends to put the tilt adjusting member 30 to the original upright position—accumulated in the first torsion coil spring 40 as the result of the backward pivotal movement of the tilt adjusting member 30 is hindered from being exerted, because the teeth 51 are firmly engaged with the teeth 21 by the second torsion coil spring 60. Therefore, the tilt adjusting member 30 cannot return to the original state and consequently, is retained in the backwardly inclined position. The cover 80 can be moved backward step by step according to the number of the teeth 21 traveled by the teeth 51.

Figure 10D:
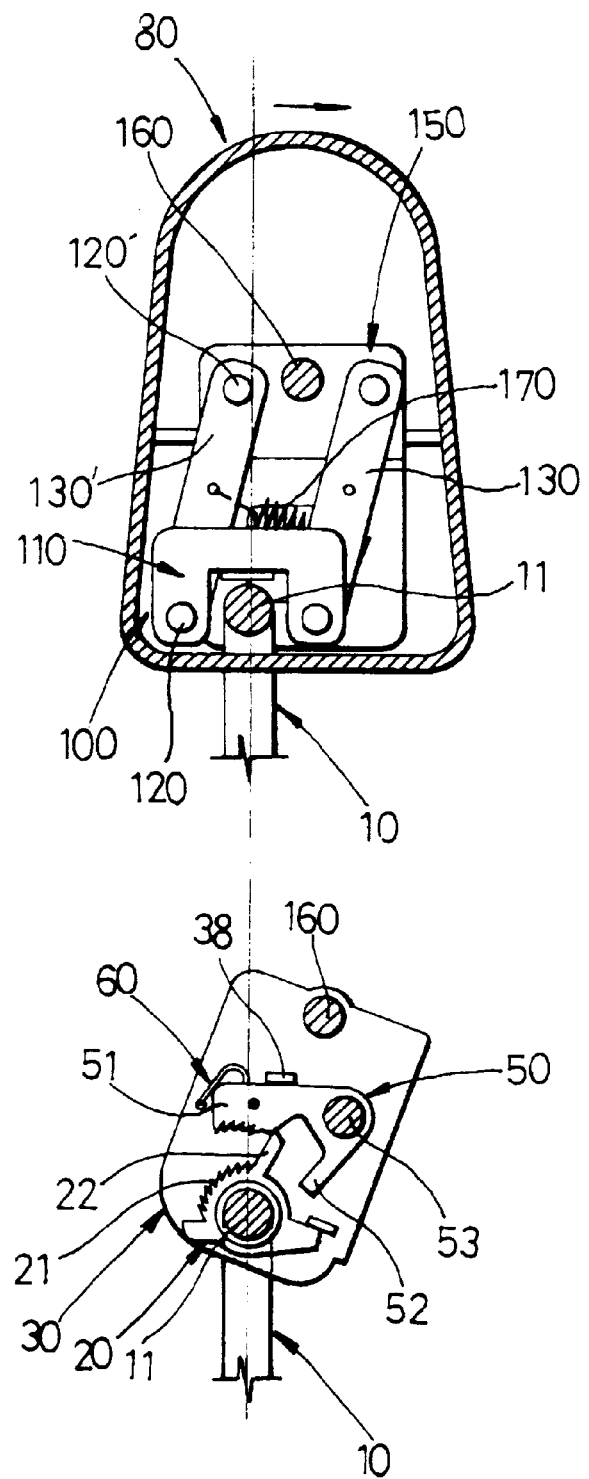

When the cover 80 is to be returned to the original position, it has to be pushed backward further as shown in FIG. 10d. By doing this, the mobile shaft 160 is carried by the mobile panels 150 and 150' and consequently, the mobile shaft 160 rotates the tilt adjusting member 30 further, thereby fully stretching the coil springs 170 and 170'.

At this stage, as in the first or second embodiment, the slope behind the teeth 51 of the check member 50 are pushed clockwise by the jaw 22 of the ratchet member 20, thereby turning the check member 50 clockwise and ultimately isolating the teeth 51 from the teeth 21.

At this moment, since the other end 62 of the second torsion coil spring 60 is hooked on the check member 50, the force exerted upwardly by the second torsion coil spring 60 prevents the check member 50 from rotating in the downward direction. Also, a strong repulsive force is accumulated in the first torsion coil spring 40 since it is compressed strongly.

When the force pushing the cover 80 backward is eliminated, the accumulated repulsive force of the first torsion coil spring 40 is released, thus the tilt adjusting member 30 rotates counterclockwise toward the original position.

Accordingly, since the mobile panels 150 and 150' and the brackets 110 and 110' fixed at the both end portions of the horizontal portion 11 of the stay 10 are in pivotal connection by means of the respective pair of the levers 130 and 130' or 140 and 140', the mobile panels 150 and 150' are moved forward by the actions of the two pairs of the pivot pins 120 and 120' that are common for the respective pair of the levers 130 and 130' or 140 and 140', the brackets 110 and 110' and the mobile panels 150 and 150'.

Thus, the cover 80 is moved forward at the same time since the mobile panels are fixed to the fixing portions 84 and 84' on the both sides of the cover.

During this movement, the jaw 52 of the check member 50 is pushed by the jaw 22 of the ratchet member 20. Therefore, the check member 50 is rotated counterclockwise. As the result, the teeth 52 engage again with the front teeth 21. At the end of this movement, the headrest is returned to its original position as shown in FIG. 10a.

Since the coil springs 170 and 170' are hooked between the levers 130' and 140' and the mobile panels 150 and 150' to pull the mobile panels 150 and 150' forward, the first torsion coil spring 40 whose main role is to bias the tilt adjusting member 30 may be replaced by an ordinary coil spring that prevents only the to-and-fro movement of the tilt adjusting member 30 on the horizontal portion and a smooth operation of the mobile panels 150 and 150' and the tilt adjusting member 30 is also possible.

Industrial Applicability

The headrest tilt adjusting device of the first and second embodiments of the present invention can substantially reduce the number of the required parts and the assembling processes of the device, consequently reducing the manufacturing costs and enhancing productivity, because they are simple in their structures and the tilt adjusting member is installed so as to pivot upon the horizontal portion of the stay.

Moreover, the third embodiment provides a headrest traversing device by utilizing the same headrest tilting apparatus as that of the first or second embodiments. Its manufacturing process is substantially simple because it can be made by simply adding a few parts to the above headrest tilting device.

I claim:

1. A headrest tilting device for an automobile comprising:
   a stay (10) made of a steel rod having a horizontal portion (11) and a pair of parallel vertical portions (12) extending respectively from opposite ends of the horizontal portion (11);
   a ratchet member (20) fixed to the horizontal portion (11) of said stay, and including teeth (21) and a jaw (22) and a depression between the teeth (21) and the jaw (22);

a tilt adjusting member (30) having first and second parallel side panels (31) and (32) having lower portions that are in pivotal engagement with the horizontal portion (11) of the stay (10), and wherein an inner surface of the first side panel (31) adjoins an outside surface of the ratchet member (20);

a first torsion coil spring (40) wound around the horizontal portion (11) of the stay (10), interposed between the ratchet member (20) and the second side panel (32) of the tilt adjusting member (30), and having two ends respectively hooked on the ratchet member (20) and the second side panel (32) of the tilt adjusting member (40);

a check member (50) having teeth (51) to travel and engage with the teeth (21) of the ratchet member (20) and a jaw (52) for interacting with the jaw (22) of the ratchet member, which is so installed to the inner surface of the first side panel (31) of the tilt adjusting member as to prevent the reverse rotation of the tilt adjusting member (30); and a second torsion coil spring (60), opposite ends of which are respectively hung on upper portions of the first side panel (31) of the tilt adjusting member (30) and the check member (50).

2. The headrest tilting device as claimed in claim 1, wherein the first and second side panels (31) and (32) of the tilt adjusting member (30) are formed by bending the lateral sides of a plate to make each a right angle with a remaining intermediate portion of the plate and by providing a engaging groove (33) on a lower edge of each of the first and second side panels so that they may be pivotably engaged with the horizontal portion (11) of the stay by a fixing member.

3. The headrest tilting device as claimed in claim 2, wherein the fixing member (70) is formed by bending a steel wire to have a intermediate portion (71), two parallel portions (72) extending respectively from opposite end parts of the intermediate portion (71) and two respective ends of the two parallel portions inwardly bent therefrom and wherein the fixing member is arranged to support the stay (10) onto the tilt adjusting member (30) by the opposite end parts of its intermediate portion (71) being hung on corresponding hanging grooves (34) of the tilt adjusting member (30), the parallel portions (72) being attached to support the horizontal portion (11) of the stay (10), and the two inwardly bent ends (73) being hooked in corresponding hanging holes (35) of the tilt adjusting member (30).

4. The headrest tilting device as claimed in claim 1, wherein the tilt adjusting member (30) is formed by putting the first side panel upon the second side panel and welding together connecting portions (31') and (32') of the side panels (31) and (32), and providing each of the side panels with a pivot hole (301) at a lower middle portion to accommodate the horizontal portion (11) of the stay (10).

5. The headrest tilting device as claimed in claim 1, further comprising a cover (80) having sidewalls with protrusions formed therein for receiving and fixing a verge of the tilt adjusting member (30) therebetween, and opposing half-circle receivers (82) and (82') to receive the horizontal portion (11) of the stay (10) for pivotal engagement of the tilt adjusting member (30) with the cover (80), wherein both of the vertical portions (12) of the stay (10) are exposed out of openings formed at a bottom of the cover (80).

6. A device for moving headrest back and forth comprising;

a stay (10) made by bending a steel rod to have a horizontal portion (11) and a pair of parallel vertical portions (12) extending from both ends of the horizontal portion (11);

a ratchet member (20) which is fixed to the horizontal portion (11) of said stay, and which is provided with a plurality of teeth (21) and a jaw (22) with a depression between them;

a tilt adjusting member (30) having a pair of parallel side panels (31) and (32) each having a lower portion in pivotal engagement with the horizontal portion (11) of the stay (10);

a first torsion coil spring (40) which is mounted on the horizontal portion of the stay (10) to bias the tilt adjusting member (30) in a direction opposite to a reverse rotation direction of the tilt adjusting member;

a check member (50) having teeth (51) to travel and engage with the teeth (21) of the ratchet member (20) and a jaw (52) to interact with the jaw (22) of said ratchet member, said check member pivotably mounted to the inner surface of one of the side panels (31) of the tilt adjusting member (30) in such a manner so as to prevent reverse rotation of the tilt adjusting member (30);

a second torsion coil spring (60), opposite ends of which are respectively hung on upper parts of the one of the side panels (31) of the tilt adjusting member (30) and the check member (50);

a back and forth movement device (100) which is mounted on the horizontal portion (11) of the stay (10) and arranged to move a cover (80) back and forth, and in which the tilt adjusting member (30) and the horizontal portion (11) of stay (10) are fixed;

a mobile shaft (160) axially mounted to pass through upper parts of the pair of side panels (31) and (32) of the tilt adjusting member (30) and having opposite ends fixed to the back and forth movement device (100).

7. The device for moving headrest back and forth as claimed in claim 6, wherein the back and forth movement device (100) comprises:

a first bracket (110) and a second bracket (110'), each having a horizontal extension fixed on the horizontal portion (11) of the stay (10);

a first pair of levers (130) and (130') in pivotal engagement with front and back legs of the first bracket (110) through pivot pins;

a second pair of levers (140) and (140') in pivotal engagement with front and back legs of the second bracket (110') through pivot pins;

a first mobile panel (150), having an upper portion of which is in pivotal engagement with the first pair of levers (130) and (130');

a second mobile panel (150') having an upper portion of which is in pivotal engagement with the second pair of the levers or (140) and (140'); and a mobile shaft (160), which is inserted through upper middle portions of the side panels of the tilt adjusting member for pivotal engagement and having first and second ends which are respectively fixed at upper middle portions of the first and second mobile panels (150) and (151').

8. The device for moving headrest back and forth as claimed in claim 7, wherein only lower portions of the first and second mobile panels (150) and (150') of the back and forth movement device (100) are respectively accommodated in first and second depressed inner walls of the cover (80).

9. The device for moving headrest back and forth as claimed in claim 7, further comprising first and second coil springs (170) and (170') which are hooked respectively between one of the first pair of levers (130') and the first mobile panel (150) and between one of the second pair of levers (140') and the second mobile panel (150') so as to draw the mobile panels (150) and (150') forward.

10. A headrest tilting device for an automobile comprising:
- a stay comprising a horizontal portion and a pair of parallel vertical portions extending from opposite ends of the horizontal portion;
- a ratchet member fixed to the horizontal portion of the stay and comprising a plurality of teeth, a jaw, and a depression therebetween;
- a tilt adjusting member comprising first and second parallel side panels each having a lower portion in pivotal engagement with the stay's horizontal portion, an inner surface of the first side panel adjoining an outside surface of the ratchet member;
- a first torsion coil spring wound around the stay's horizontal portion, interposed between the ratchet member and the second side panel, and having opposite ends respectively attached to the ratchet member and the second side panel; and
- a check member comprising teeth that travel and engage with the ratchet member's plurality of teeth and a jaw that interacts with the ratchet member's jaw and which is installed to the inner surface of the first side panel in a manner preventing reverse rotation of the tilt adjusting member.

11. The headrest tilting device as claimed in claim 10 further comprising a second torsion coil spring having opposite ends respectively attached to an upper portion of the first side panel and the check member.

12. The headrest tilting device as claimed in claim 10, wherein the first and second side panels of the tilt adjusting member are formed by bending lateral sections of a plate to make each a right angle with a remaining intermediate section of the plate and by provided a engaging groove on each of front edges of the lateral sections so that they may be pivotably engaged with the stay's horizontal portion by a fixing member.

13. The headrest tilting device as claimed in claim 12, wherein the fixing member is formed by bending a steel wire so that it has an intermediate portion, two parallel portions extending respectively from opposite ends of the intermediate portion, and two inwardly bent portions extending respectively inwardly from respective ends of the two parallel portions and wherein the fixing member is arranged to support the stay on the tilt adjusting member by the parallel portions of the fixing members intermediate portion being hung on corresponding hanging grooves in the tilt adjusting member, the fixing member's parallel portions being attached to support the stay's horizontal portion, and the two inwardly bent portions being hooked in corresponding hanging holes of the tilt adjusting member.

14. The headrest tilting device as claimed in claim 10, wherein the tilt adjusting member is formed by putting the first side panel on the second side panel, welding together connecting portions of the side panels, and providing a lower middle portion of each of the side panels with a pivot hole to accommodate the stay's horizontal portion.

15. The headrest tilting device as claimed in claim 10, further comprising a cover comprising side walls having protrusions that receive and fix a verge of the tilt adjusting member therebetween and opposing half-circle receivers that receive the stay's horizontal portion for pivotal engagement of the tilt adjusting member with the cover, wherein both of the stay's vertical portions are exposed out of openings formed on a bottom side of the cover.

16. The headrest tilting device as claimed in claim 15, further comprising a back-and-forth movement device mounted on the stay's horizontal portion and arranged to move the cover back and forth and a mobile shaft attached to the back-and-forth device and axially positioned to pass through upper parts of the first and second side panels of the tilt adjusting member.

17. The device for moving headrest back and forth as claimed in claim 16, wherein the back and forth movement device comprises two back-and-forth bracket devices each including:
- a bracket having a horizontal extension fixed on a respective end of the stay's horizontal portion and having front and back legs;
- a pair of levers in pivotal engagement with the front and back legs of the bracket through pivot pins;
- a mobile panel having an upper portion in pivotal engagement with the pair of levers and an upper middle portion to which the mobile shaft is attached.

18. The device for moving headrest back and forth as claimed in claim 17, wherein only lower portions of the mobile panels of the back and forth movement device are respectively accommodated in two depressed inner wall sections of the cover.

19. The device for moving headrest back and forth as claimed in claim 17 wherein each of the bracket devices of the back-and-forth device further comprises a coil spring attached between an upper one of the levers and the mobile panel so as to draw the mobile panels forward.

\* \* \* \* \*